US012679468B2

(12) United States Patent
    Kurioka et al.

(10) Patent No.: US 12,679,468 B2
(45) Date of Patent: Jul. 14, 2026

(54) OFF-ROAD VEHICLE

(71) Applicant: KAWASAKI MOTORS, LTD., Hyogo (JP)

(72) Inventors: Hiromasa Kurioka, Akashi (JP); Hidenori Kikuchi, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 349 days.

(21) Appl. No.: 18/467,243

(22) Filed: Sep. 14, 2023

(65) Prior Publication Data

US 2025/0091652 A1 Mar. 20, 2025

(51) Int. Cl.
    *B62D 25/07* (2006.01)

(52) U.S. Cl.
    CPC .................................... *B62D 25/07* (2013.01)

(58) Field of Classification Search
    CPC ...... B62D 25/06; B62D 25/07; B62D 27/023; B62D 23/005
    USPC .................................... 296/210, 213, 205, 29
    See application file for complete search history.

(56) References Cited

U.S. PATENT DOCUMENTS

| | | | | |
|---|---|---|---|---|
| 5,725,273 A | * | 3/1998 | Vernon | B60J 7/201 |
| | | | | 224/326 |
| 5,738,405 A | * | 4/1998 | Richters | B62D 65/04 |
| | | | | 296/147 |
| 6,003,936 A | * | 12/1999 | Gordon | B60J 7/106 |
| | | | | 296/213 |
| 6,203,100 B1 | * | 3/2001 | Gordon | B60J 7/106 |
| | | | | 296/213 |
| 6,309,007 B1 | * | 10/2001 | Essig | B60J 10/00 |
| | | | | 296/218 |
| 7,828,364 B2 | * | 11/2010 | Causey | B60J 7/102 |
| | | | | 296/136.12 |
| 10,435,077 B2 | | 10/2019 | Schmidt | |
| 10,787,131 B2 | * | 9/2020 | Marchlewski | B60R 9/04 |
| 11,613,224 B2 | * | 3/2023 | Eddings | B60R 21/13 |
| | | | | 280/756 |
| 2024/0124066 A1 | * | 4/2024 | Jeon | B60J 5/047 |

FOREIGN PATENT DOCUMENTS

| | | | | |
|---|---|---|---|---|
| JP | 2017177914 A | * | 10/2017 | B60J 7/00 |

* cited by examiner

*Primary Examiner* — Jason D Shanske
(74) *Attorney, Agent, or Firm* — Studebaker Brackett PLLC

(57) ABSTRACT

The utility vehicle 100 includes a front roof 11 and a rear roof 12 located in rear of the front roof 11. A rear end portion 13 of the front roof 11 overlaps with a front end portion 14 of the rear roof 12 in an upper-lower direction, and is positioned higher than the front end portion 14.

10 Claims, 7 Drawing Sheets

REAR

RIGHT

LEFT

FRONT

FRONT

LEFT ⟷ RIGHT

REAR

UP

LEFT ←→ RIGHT

DOWN

OFF-ROAD VEHICLE

FIELD

The technique disclosed herein relates to an off-road vehicle.

BACKGROUND

U.S. Pat. No. 10,435,077 discloses a vehicle including a roof. The roof protects an occupant from rain and wind.

SUMMARY

In a case of traveling air having entered a vehicle interior through, e.g., a clearance of the roof, the occupant feels discomfort.

The technique disclosed herein has been made in view of the above-described point, and an object thereof is to prevent traveling air from entering a vehicle interior through a roof.

An off-road vehicle disclosed herein includes a front roof and a rear roof located in rear of the front roof. A rear end portion of the front roof overlaps with a front end portion of the rear roof in an upper-lower direction, and is positioned higher than the front end portion.

The off-road vehicle is configured to prevent traveling air from entering a vehicle interior through the roof.

DESCRIPTION OF EMBODIMENTS

Figure 1:
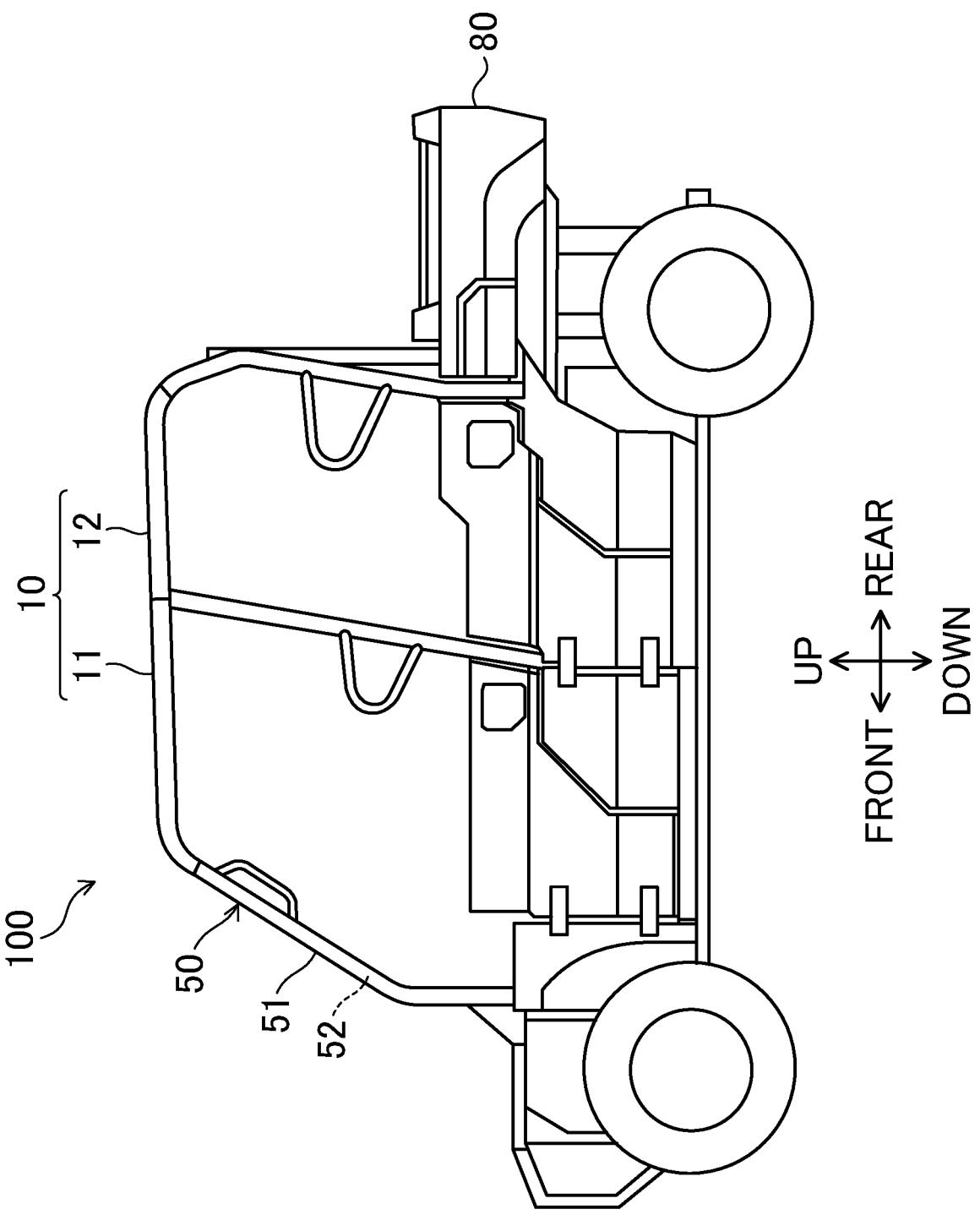
FIG. 1 is a side view of a utility vehicle.

Hereinafter, an exemplary embodiment will be described based on the drawings. FIG. 1 is a side view of a utility vehicle 100.

The utility vehicle 100 is a four-wheeled vehicle that can travel off road. The utility vehicle 100 is one example of an off-road vehicle. Hereinafter, the utility vehicle 100 will also be merely referred to as a "vehicle 100."

In the present disclosure, each component of the vehicle 100 will be described using a direction with respect to the vehicle 100. Specifically, a "front" means the front of the vehicle 100 in a vehicle front-rear direction, and a "rear" means the rear of the vehicle 100 in the vehicle front-rear direction. A "left" means the left when facing the front of the vehicle 100, and a "right" means the right when facing the front of the vehicle 100. Note that a right-left direction will also be referred to as a "vehicle width direction." In the present disclosure, parallel, perpendicular, same, coincident, simultaneous, or center includes not only precise parallel, perpendicular, same, coincident, simultaneous, or center, but also substantial parallel, perpendicular, same, coincident, simultaneous, or center.

The vehicle 100 includes a front roof 11 and a rear roof 12 located in rear of the front roof 11. The front roof 11 and the rear roof 12 are included in a roof 10. The roof 10 is located above an occupant. The roof 10 is, for example, made of resin. The vehicle 100 may further include a first roof side rail 51 and a second roof side rail 52 extending in the front-rear direction and aligned in the vehicle width direction. The roof 10 is located on the first roof side rail 51 and the second roof side rail 52. In the vehicle width direction, the roof 10 extends from the outside of the first roof side rail 51 to the outside of the second roof side rail 52.

Specifically, the vehicle 100 includes a vehicle body 80 and a roll-over protective structure (ROPS) 50 attached to the vehicle body 80. The ROPS 50 protects an occupant, for example, when the vehicle 100 turns over. The ROPS 50 includes frames. Each frame is, for example, a metal pipe. The ROPS 50 is located on the vehicle body 80. The first roof side rail 51 and the second roof side rail 52 are part of the ROPS 50. Specifically, the first roof side rail 51 is a frame located on the leftmost side and extending in the front-rear direction among the frames of the ROPS 50. The second roof side rail 52 is a frame located on the rightmost side and extending in the front-rear direction among the frames of the ROPS 50. The roof 10 is located on the ROPS 50. The roof 10 is attached to the ROPS 50.

Figure 2:
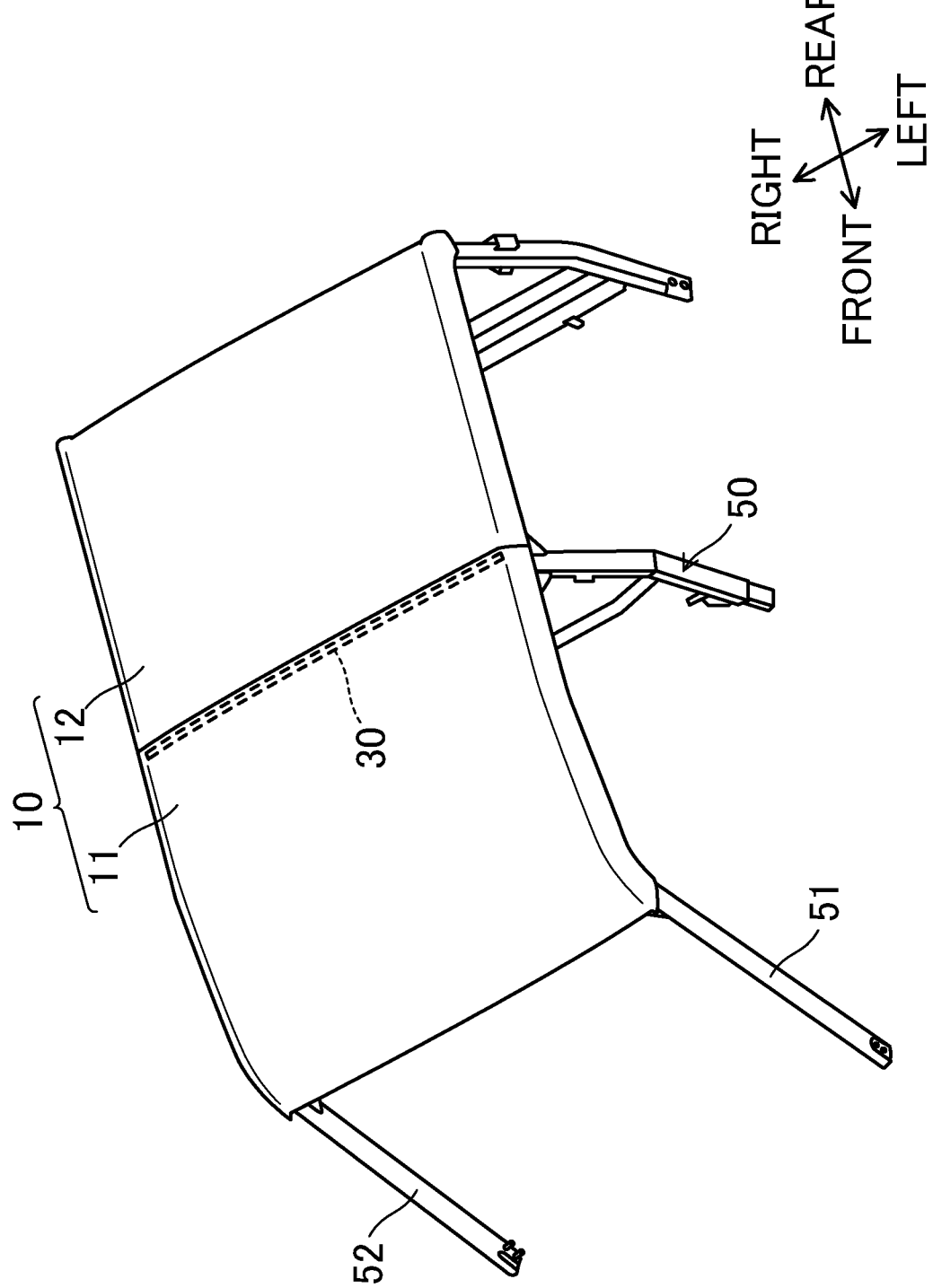
FIG. 2 is a perspective view of a roof and a ROPS from the left front.

FIG. 2 is a perspective view of the roof 10 and the ROPS 50 from the left front. In this example, the roof 10 is entirely in a rectangular shape as viewed in an upper-lower direction. As described above, the roof 10 includes the front roof 11 and the rear roof 12. That is, the roof 10 is divided into two roofs in the front-rear direction.

Figure 3:
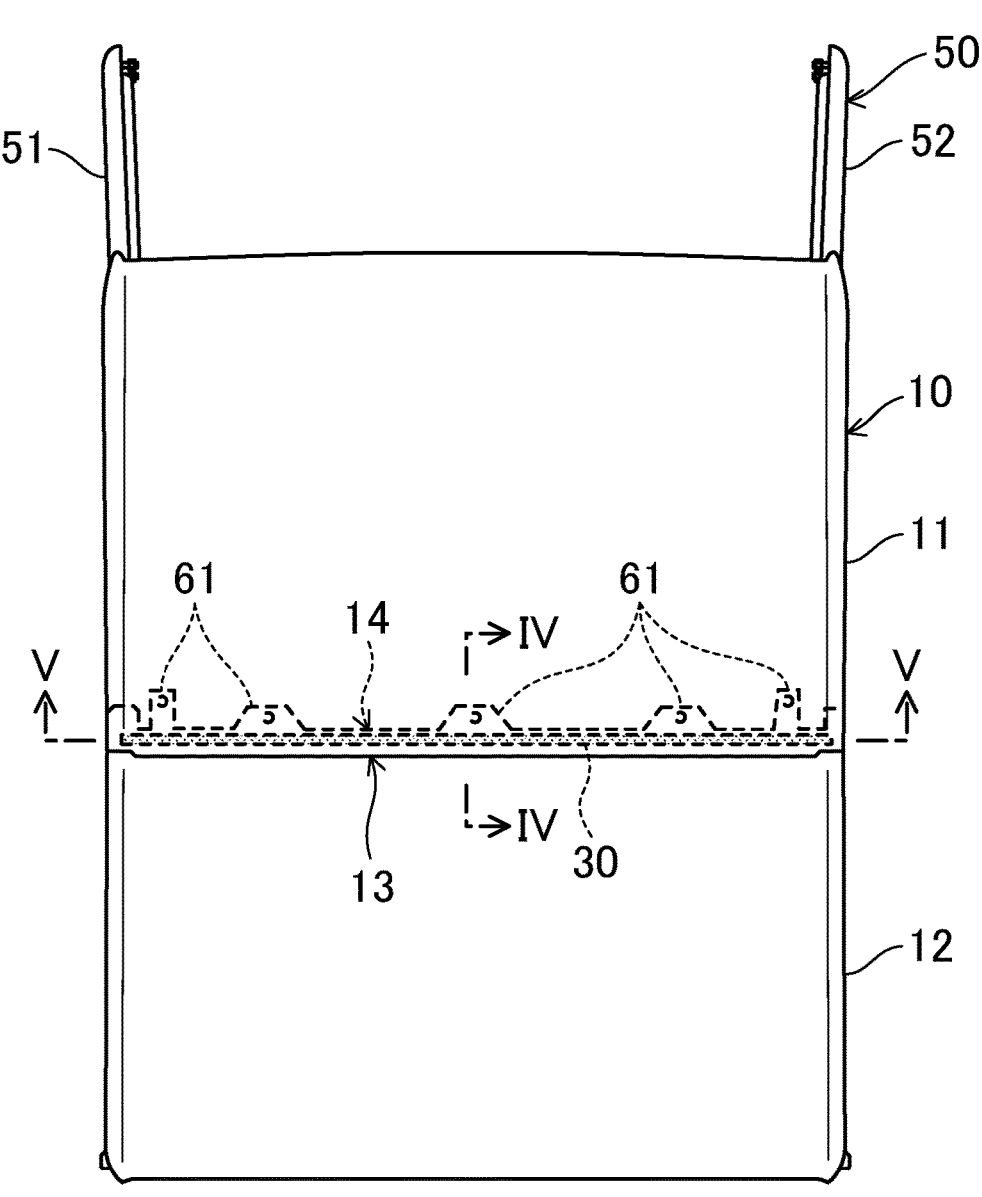
FIG. 3 is a plan view of the roof and the ROPS.
Figure 3:
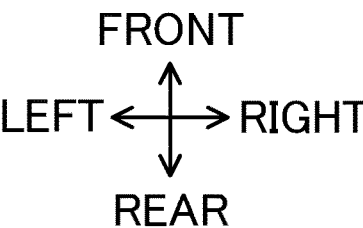

FIG. 3 is a plan view of the roof 10 and the ROPS 50. In FIG. 3, a sealant 30 is dotted for the sake of convenience in description. A rear end portion 13 of the front roof 11 overlaps with a front end portion 14 of the rear roof 12 in the upper-lower direction. The rear end portion 13 is positioned higher than the front end portion 14. The rear end portion 13 and the front end portion 14 are attached to each other. That is, the front roof 11 and the rear roof 12 are attached to each other. The roof 10 may further include the sealant 30 that seals between the front roof 11 and the rear roof 12.

Each of the front roof 11 and the rear roof 12 is entirely in a rectangular shape as viewed in the upper-lower direction. The width of the front roof 11 in the vehicle width direction is the same as the width of the rear roof 12 in the vehicle width direction. In this example, the length of the front roof 11 in the front-rear direction is substantially same as the length of the rear roof 12 in the front-rear direction. In terms of a position in the vehicle width direction, the position of the front roof 11 is coincident with the position of the rear roof 12. Each of the front roof 11 and the rear roof 12 extends from the first roof side rail 51 to the second roof side rail 52. Specifically, both end portions of each of the front roof 11 and the rear roof 12 in the vehicle width direction are located on the first roof side rail 51 and the second roof side rail 52.

Figure 4:
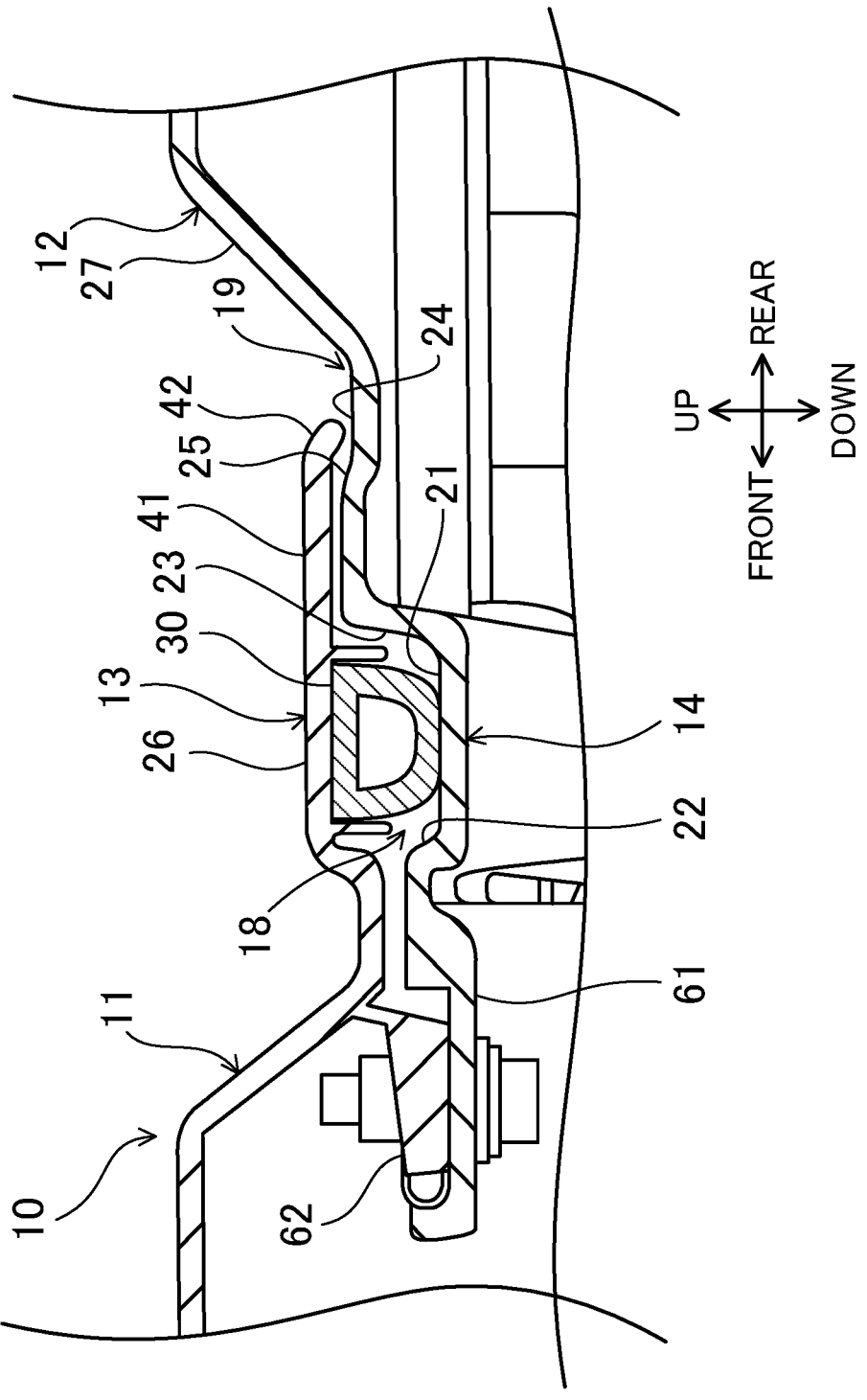
FIG. 4 is a sectional view along an IV-IV line of FIG. 3.

FIG. 4 is a sectional view along an IV-IV line of FIG. 3. The front end portion 14 of the rear roof 12 includes a first bottom wall 21 facing the rear end portion 13 of the front roof 11 in the upper-lower direction and a first standing wall 22 standing from the first bottom wall 21. The first bottom wall 21 extends substantially in the front-rear direction and the vehicle width direction. Specifically, the longitudinal direction of the first bottom wall 21 is coincident with the vehicle width direction, and the lateral direction of the first bottom wall 21 is coincident with the front-rear direction. The first standing wall 22 blocks water flowing from the rear to the front. In this example, the first standing wall 22 is inclined with respect to the upper-lower direction. Specifically, the first standing wall 22 is inclined so as to be positioned higher as extending forward. The first standing wall 22 is coupled to the front end of the first bottom wall 21.

Figure 5:
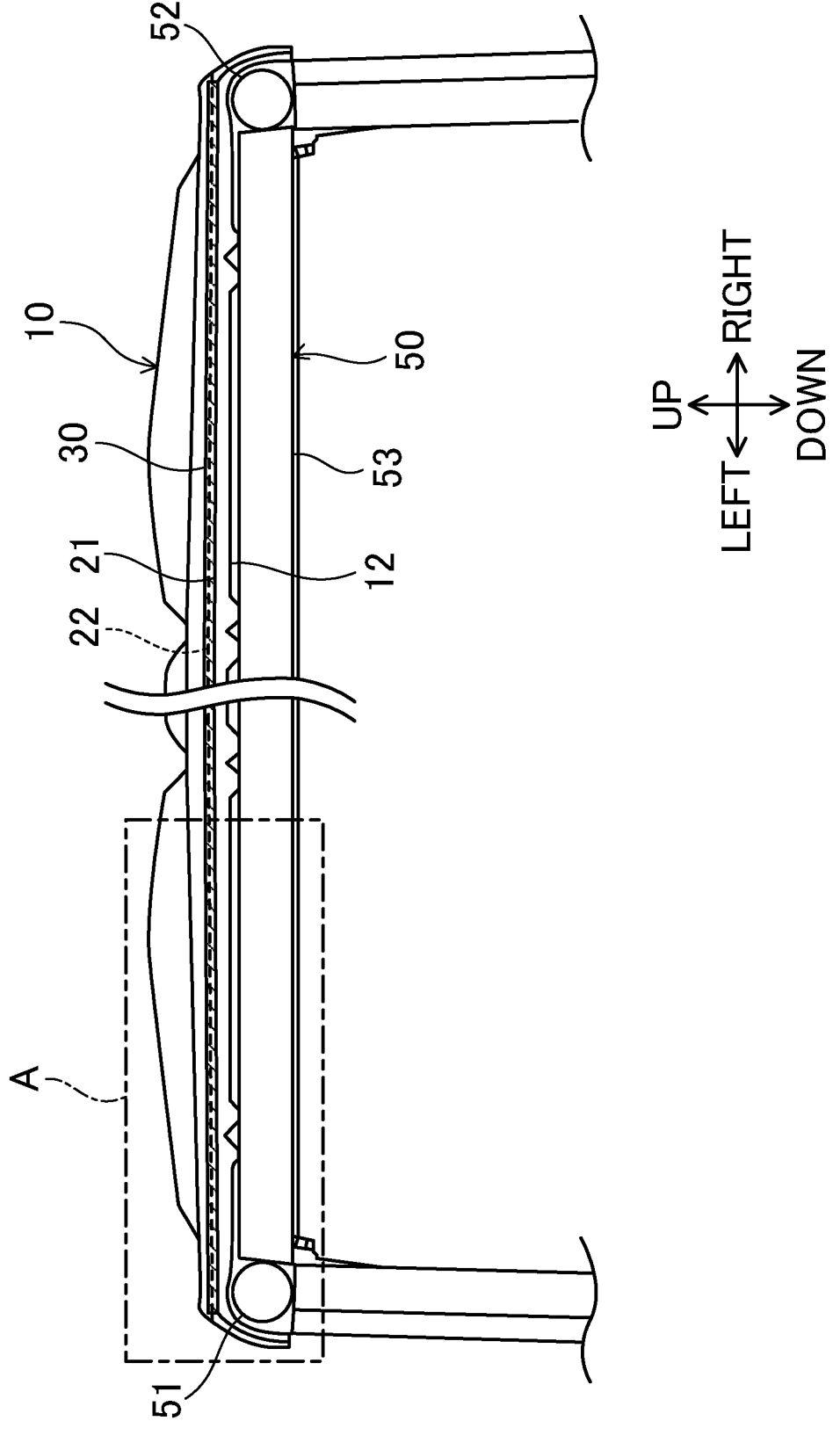
FIG. 5 is a sectional view along a V-V line of FIG. 3.

FIG. 5 is a sectional view along a V-V line of FIG. 3. Each of the first bottom wall 21 and the first standing wall 22 extends in the vehicle width direction. In this example, each of the first bottom wall 21 and the first standing wall 22 extends from the first roof side rail 51 to the second roof side rail 52. Specifically, both end portions of each of the first bottom wall 21 and the first standing wall 22 in the vehicle width direction are located on the first roof side rail 51 and the second roof side rail 52.

Figure 6:
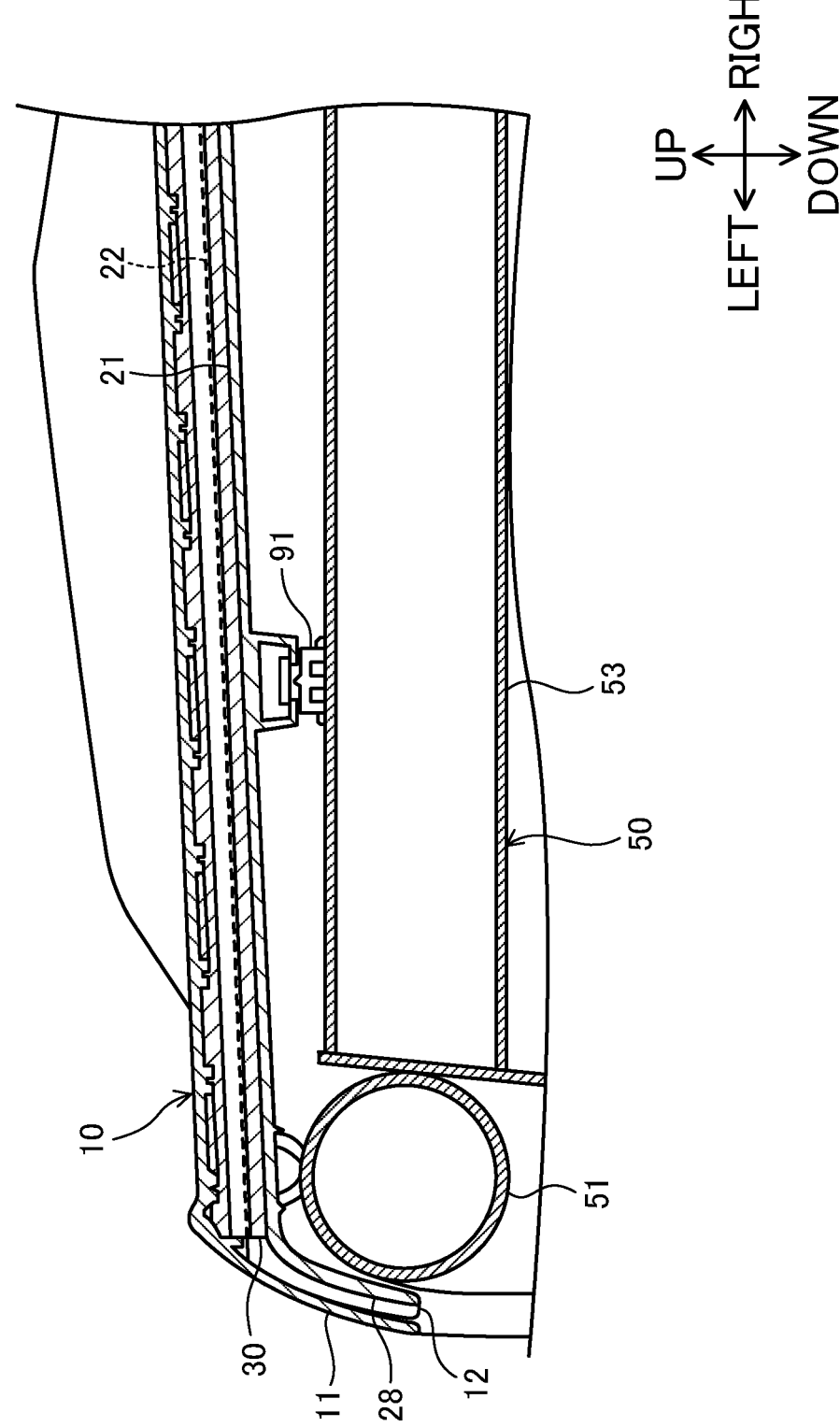
FIG. 6 is an enlarged view of a portion A of FIG. 5.

FIG. 6 is an enlarged view of a portion A of FIG. 5. The first bottom wall 21 extends downward as extending from the inside in the vehicle width direction to the outside in the vehicle width direction. That is, the first bottom wall 21 is inclined with respect to the horizontal plane such that a height at the outer end in the vehicle width direction is lower than a height at the center in the vehicle width direction. FIG. 6 shows a left portion of the roof 10 in the vehicle width direction, but the same also applies to a right portion of the roof 10 in the vehicle width direction. That is, at the right portion of the roof 10 in the vehicle width direction, the first bottom wall 21 also extends downward as extending from the inside in the vehicle width direction to the outside in the vehicle width direction. That is, in this example, the first bottom wall 21 is curved such that the height thereof is greatest at the center in the vehicle width direction.

Figure 7:
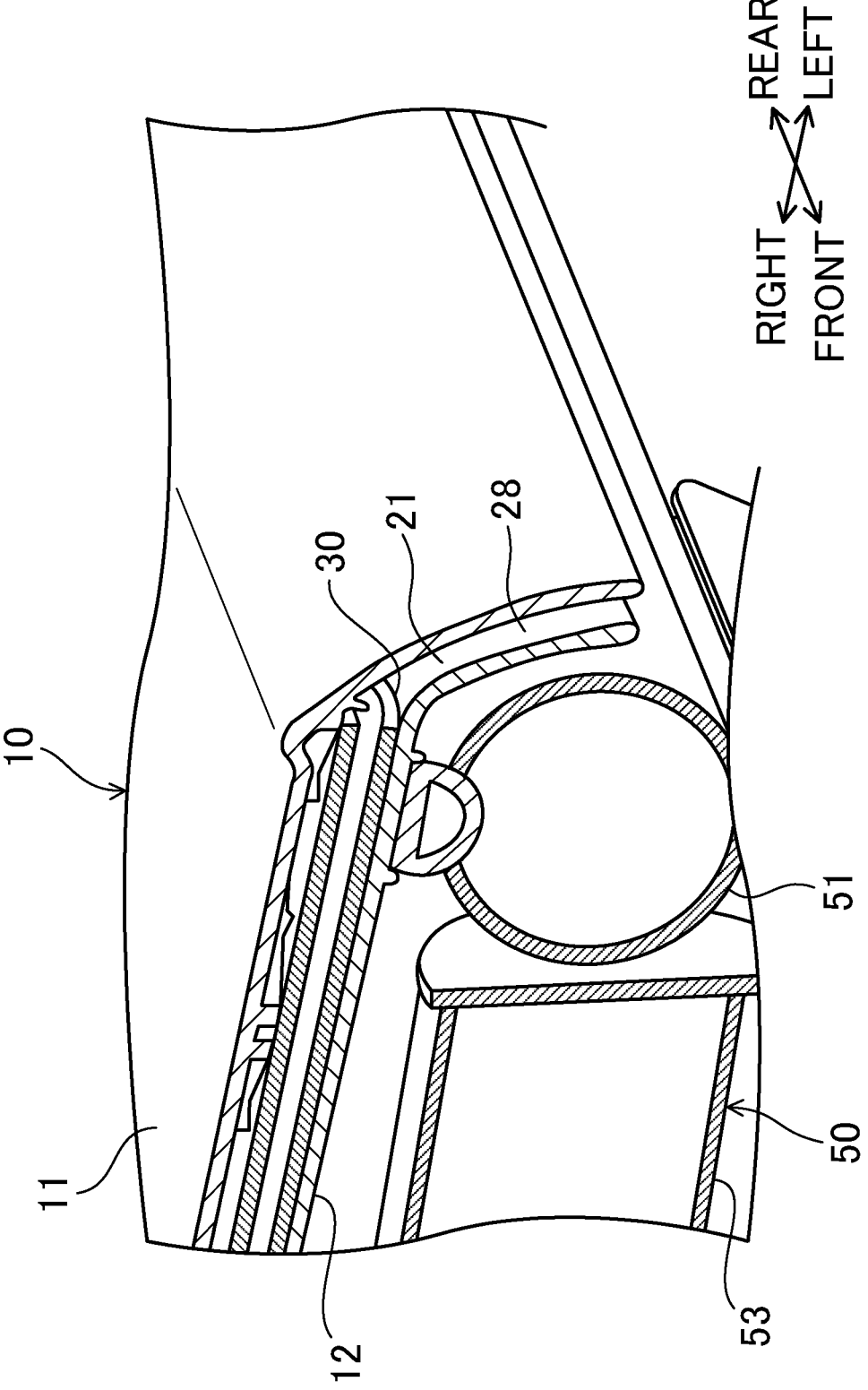
FIG. 7 is a perspective view of an end portion of the roof in a vehicle width direction.

FIG. 7 is a perspective view of the left ends of the roof 10 and the ROPS 50 from the left front. In FIG. 7, the roof 10 and the ROPS 50 are shown with cut along a plane perpendicular to the front-rear direction. An outer end portion 28 of the first bottom wall 21 in the vehicle width direction is curved so as to be positioned lower as extending outward in the vehicle width direction. Similarly, at the right ends of the roof 10 and the ROPS 50, an outer end portion of the first bottom wall 21 in the vehicle width direction is curved so as to be positioned lower as extending outward in the vehicle width direction.

As shown in FIG. 4, the front end portion 14 may further include a second standing wall 23 located in rear with respect to the first standing wall 22 and standing from the first bottom wall 21. The second standing wall 23 faces the first standing wall 22. In this example, the second standing wall 23 is inclined with respect to the upper-lower direction. Specifically, the second standing wall 23 is inclined so as to be positioned higher as extending rearward. In this example, the height of the second standing wall 23 in the upper-lower direction is greater than the height of the first standing wall 22 in the upper-lower direction. That is, in terms of a position in the upper-lower direction, the upper end of the second standing wall 23 is positioned higher than the upper end of the first standing wall 22. The second standing wall 23 is coupled to the rear end of the first bottom wall 21.

The second standing wall 23 extends in the vehicle width direction. In this example, the second standing wall 23 extends from the first roof side rail 51 (see FIG. 5) to the second roof side rail 52 (see FIG. 5). Specifically, both end portions of the second standing wall 23 in the vehicle width direction are located above the first roof side rail 51 and the second roof side rail 52.

The first bottom wall 21, the first standing wall 22, and second standing wall 23 define a first drainage 18 extending in the vehicle width direction. The first drainage 18 guides water along the vehicle width direction. As described above, in this example, each of the first bottom wall 21, the first standing wall 22, and the second standing wall 23 extends from the first roof side rail 51 to the second roof side rail 52. That is, the first drainage 18 extends from the first roof side rail 51 to the second roof side rail 52. The water guided by the first drainage 18 is discharged to the outside of the first roof side rail 51 and the second roof side rail 52 in the vehicle width direction.

The front end portion 14 may further include a second bottom wall 24 located in rear with respect to the second standing wall 23 and a third standing wall 25 standing from the second bottom wall 24. The front end portion 14 may further include a fourth standing wall 27 located in rear with respect to the third standing wall 25 and standing from the second bottom wall 24.

The second bottom wall 24 extends substantially in the front-rear direction and the vehicle width direction. Specifically, the longitudinal direction of the second bottom wall 24 is coincident with the vehicle width direction, and the lateral direction of the second bottom wall 24 is coincident with the front-rear direction. In this example, in terms of a position in the upper-lower direction, the second bottom wall 24 is located between the lower end (i.e., the rear end of the first bottom wall 21) of the second standing wall 23 and the upper end of the second standing wall 23. That is, in terms of a position in the upper-lower direction, the second bottom wall 24 is positioned lower than the upper end of the second standing wall 23.

The third standing wall 25 blocks water flowing from the rear to the front. The third standing wall 25 is located in rear with respect to the second standing wall 23. In this example, the third standing wall 25 is inclined with respect to the upper-lower direction. Specifically, the third standing wall 25 is inclined so as to be positioned higher as extending forward. In this example, in terms of a position in the upper-lower direction, the position of the upper end of the third standing wall 25 is coincident with the position of the upper end of the second standing wall 23. The third standing wall 25 is coupled to the front end of the second bottom wall 24.

The fourth standing wall 27 is inclined with respect to the upper-lower direction. Specifically, the fourth standing wall 27 is inclined so as to be positioned higher as extending rearward. In this example, in terms of a position in the upper-lower direction, the upper end of the fourth standing wall 27 is positioned higher than the upper end of the third standing wall 25. The fourth standing wall 27 is coupled to the rear end of the second bottom wall 24.

Each of the second bottom wall 24, the third standing wall 25, and the fourth standing wall 27 extends in the vehicle width direction. Each of the second bottom wall 24, the third standing wall 25, and the fourth standing wall 27 preferably extends from the first roof side rail 51 to the second roof side rail 52. Specifically, both end portions of each of the second bottom wall 24, the third standing wall 25, and the fourth standing wall 27 in the vehicle width direction are preferably located on the first roof side rail 51 and the second roof side rail 52.

The second bottom wall 24, the third standing wall 25, and the fourth standing wall 27 define a second drainage 19 extending in the vehicle width direction. The second drainage 19 guides water along the vehicle width direction. As in the first drainage 18, the water guided by the second drainage 19 is discharged to the outside in the vehicle width direction from the roof 10. The second drainage 19 is positioned in rear with respect to the first drainage 18. Thus, in this example, water flowing from the rear to the front is first discharged through the second drainage 19. Water which cannot be discharged through the second drainage 19 is discharged through the first drainage 18.

The rear end portion 13 includes a top wall 26 facing the first bottom wall 21 in the upper-lower direction and extending in the vehicle width direction. The top wall 26 overlaps with the front end portion 14 in the upper-lower direction, and therefore, reduces the amount of water entering between the rear end portion 13 and the front end portion 14. The top wall 26 extends substantially in the front-rear direction and the vehicle width direction. The top wall 26 covers at least the first bottom wall 21. In this example, the top wall 26 covers the first bottom wall 21, the first standing wall 22, the second standing wall 23, part of the second bottom wall 24, and the third standing wall 25.

In this example, the front roof 11 extends to the rear beyond the third standing wall 25. Specifically, a portion of the rear end portion 13 positioned in rear with respect to the third standing wall 25 extends downward as extending rearward, and extends to a position lower than the upper end of the third standing wall 25. More specifically, the rear end portion 13 (specifically, top wall 26) includes a flat portion 41 and a curved portion 42 coupled to the rear end of the flat portion 41. The flat portion 41 extends substantially in the front-rear direction and the vehicle width direction. The curved portion 42 is curved so as to be positioned lower as extending rearward. The rear end of the curved portion 42 is positioned lower than the upper end of the third standing wall 25.

The sealant 30 blocks, between the rear end portion 13 and the front end portion 14, water flowing from the rear to the front. The sealant 30 is, for example, made of rubber. In this example, the sealant 30 is in a hollow shape. The sealant 30 is deformable at least in a direction perpendicular to the longitudinal direction thereof (in this example, vehicle width direction).

The sealant 30 contacts, between the top wall 26 and the first bottom wall 21, both the top wall 26 and the first bottom wall 21. In other words, the sealant 30 closely contacts both the top wall 26 and the first bottom wall 21. Further, in this example, the sealant 30 is located between the first standing wall 22 and the second standing wall 23. That is, the sealant 30 is located in the first drainage 18. In this example, the sealant 30 is separated from the second standing wall 23. That is, there is a clearance between the sealant 30 and the second standing wall 23.

As shown in FIG. 5, the sealant 30 extends in the vehicle width direction. In this example, the sealant 30 extends from the first roof side rail 51 to the second roof side rail 52. Specifically, both end portions of the sealant 30 in the vehicle width direction are located on the first roof side rail 51 and the second roof side rail 52.

Specifically, as shown in FIG. 4, the sealant 30 is attached to the top wall 26. In this example, the sealant 30 separatably contacts the first bottom wall 21. In a state of the sealant 30 not contacting the first bottom wall 21 (i.e., a state of the front roof 11 and the rear roof 12 being separated from each other), the lower surface of the sealant 30 is curved so as to protrude downward in a section perpendicular to the longitudinal direction of the sealant 30. The lower surface of the sealant 30 is a portion of the outer surface of the sealant 30 facing the first bottom wall 21. When the front roof 11 is attached to the rear roof 12, the lower surface of the sealant 30 is pressed against the first bottom wall 21, and accordingly, the sealant 30 is compressed and deformed in the upper-lower direction. In this manner, at least part of the lower surface of the sealant 30 closely contacts the first bottom wall 21.

The front end portion 14 further includes a first attachment piece 61 extending forward from the first standing wall 22. The first attachment piece 61 is one example of an attachment piece. In this example, the first attachment piece 61 is substantially in a plate shape. The first attachment piece 61 is integrated with the first standing wall 22. The front roof 11 is attached to the rear roof 12 through the first attachment piece 61.

Specifically, the rear end portion 13 of the front roof 11 further includes a second attachment piece 62 protruding from the lower surface of the rear end portion 13 and extending rearward. The first attachment piece 61 and the second attachment piece 62 are attached to each other, for example, through a bolt or a rivet. In this manner, the front roof 11 and the rear roof 12 are attached to each other. As shown in FIG. 3, five first attachment pieces 61 are aligned in the vehicle width direction in this example. As shown in FIG. 6, the first bottom wall 21 of the rear roof 12 is attached, through a spacer 91, to a cross frame 53 extending in the vehicle width direction among the frames of the ROPS 50. In this manner, the roof 10 is attached to the ROPS 50.

In the vehicle 100 configured as described above, the rear end portion 13 of the front roof 11 overlaps with the front end portion 14 of the rear roof 12 in the upper-lower direction, and is positioned higher than the front end portion 14. The roof 10 has a clearance between the rear end portion 13 and the front end portion 14 in some cases. While the vehicle 100 is traveling forward, traveling air flows from the front to the rear. Since the rear end portion 13 is positioned higher than the front end portion 14 in the vehicle 100, entrance of the traveling air into a vehicle interior through the clearance can be prevented even in a case where the roof 10 has the above-described clearance.

In the vehicle 100, the front end portion 14 includes the first standing wall 22. With this configuration, for example, even when water enters through the above-described clearance during traveling in the rain, the first standing wall 22 can block entrance of the water into the vehicle interior. Moreover, since the first bottom wall 21 extends downward as extending from the inside in the vehicle width direction to the outside in the vehicle width direction, the water whose entrance into the vehicle interior is blocked by the first standing wall 22 is discharged from the roof 10 after having flowed from the inside in the vehicle width direction to the outside in the vehicle width direction. With this configuration, the water can be more efficiently discharged as compared to, for example, a case of the first bottom wall 21 extending horizontally.

Since the front end portion 14 includes the second standing wall 23 in the vehicle 100, the first bottom wall 21, the first standing wall 22, and the second standing wall 23 define the first drainage 18 in the front end portion 14. Water is collected to the first drainage 18 so that water discharge can be promoted using the first drainage 18. In a case where water is discharged from the entire surface of the roof 10 in the course of events, the water drops from everywhere at the peripheral edge of the roof 10. In this example, the water is collected to the first drainage 18 so that a location from which the water drops can be controlled.

Since the front end portion 14 includes the third standing wall 25 in the vehicle 100, water flowing from the rear to the front is blocked by the third standing wall 25 in advance before reaching the second standing wall 23. This can more reliably prevents entrance of the water into the vehicle interior as compared to a case of the front end portion 14 not including the third standing wall 25. Further, in this example, the front end portion 14 includes the fourth standing wall 27, and therefore, the second bottom wall 24, the third standing wall 25, and the fourth standing wall 27 define the second drainage 19 in the front end portion 14. As in the first drainage 18, water discharge can be promoted using the second drainage 19.

Since the roof 10 includes the sealant 30 contacting both the top wall 26 and the first bottom wall 21, water is blocked by the sealant 30 in advance before reaching the first standing wall 22 even in a case of the water having entered a space in front with respect to the second standing wall 23. This can more reliably prevent entrance of the water into the vehicle interior as compared to a case of the roof 10 not including the sealant 30. Further, in a case of traveling air flowing from the rear to the front, entrance of the traveling air into the vehicle interior can be prevented even when the traveling air enters through the above-described clearance of the roof 10.

In this example, since the sealant 30 is separated from the second standing wall 23, the first drainage 18 is not fully closed with the sealant 30. That is, even in a case of the roof 10 including the sealant 30, the first drainage 18 can be ensured in the clearance between the sealant 30 and the second standing wall 23.

Each of the front roof 11, the rear roof 12, and the sealant 30 extends from the first roof side rail 51 to the second roof side rail 52. With this configuration, water blocked by the sealant 30 can be discharged to the outside in the vehicle width direction with respect to the first roof side rail 51 and the second roof side rail 52.

The front roof 11 extends to the rear beyond the third standing wall 25. With this configuration, a distance between the upper end of the third standing wall 25 and the front roof 11 can be shorter as compared to a case of the front roof 11 extending to a position in front with respect to the third standing wall 25. That is, a water entrance area can be decreased. Thus, the amount of water which can enter through the clearance between the rear end portion 13 and the front end portion 14 can be reduced. Further, in a case of traveling air flowing from the rear to the front, the amount of traveling air which can enter through the above-described clearance can be reduced. Moreover, in this example, the portion of the rear end portion 13 positioned in rear with respect to the third standing wall 25 extends downward as extending rearward, and extends to the position lower than the upper end of the third standing wall 25. With this configuration, the clearance between the rear end portion 13 and the front end portion 14 is in a labyrinth shape. That is, a flow path for water and traveling air can be meandered. As a result, water and traveling air are less likely to enter the clearance between the rear end portion 13 and the front end portion 14.

The front roof 11 is attached to the rear roof 12 through the first attachment piece 61. The first attachment piece 61 extends forward from the first standing wall 22. With this configuration, even when water flowing from the rear to the front reaches the first standing wall 22, such water is blocked by the first standing wall 22, and therefore, a state of the first attachment piece 61 getting the water thereon is prevented. As a result, corrosion of, e.g., a bolt screwed into the first attachment piece 61 can be prevented.

OTHER EMBODIMENTS

The embodiment has been described above as an example of the technique disclosed in the present application. However, the technique in the present disclosure is not limited to above, and is also applicable to embodiments to which changes, replacements, additions, omissions, etc. are made as necessary. The components described above in the embodiment may be combined to form a new embodiment. The components shown in the attached drawings and described in detail may include not only components essential for solving the problems, but also components that are provided for describing an example of the above-described technique and are not essential for solving the problems. Thus, description of these non-essential components in detail and illustration of these components in the attached drawings shall not be interpreted that these non-essential components are essential.

For example, the off-road vehicle is not limited to the utility vehicle 100. The off-road vehicle may be, for example, an all terrain vehicle (ATV) or a tractor. Moreover, the off-road vehicle is not limited to the four-wheeled vehicle, and for example, may be a three-wheeled vehicle.

The shape of the roof 10 is not limited. The roof 10 may be divided into three or more roofs in the front-rear direction. In this case, a front one of adjacent two of the divided roofs in the front-rear direction may be a front roof, and a rear one of the adjacent two of the divided roofs in the front-rear direction may be a rear roof.

The front end portion 14 of the rear roof 12 does not necessarily include one or more of the first standing wall 22, the second standing wall 23, the third standing wall 25, and the fourth standing wall 27. For example, the front end portion 14 does not necessarily include all the first standing wall 22, the second standing wall 23, the third standing wall 25, and the fourth standing wall 27. That is, for example, the flat front end portion 14 and the rear end portion 13 of the front roof 11 may overlap with each other in the upper-lower direction, and the rear end portion 13 may be positioned higher than the front end portion 14.

The height of each of the first standing wall 22, the second standing wall 23, the third standing wall 25, and the fourth standing wall 27 in the upper-lower direction is not limited. For example, the height of the first standing wall 22 in the upper-lower direction may be greater than the height of the second standing wall 23 in the upper-lower direction. That is, in terms of a position in the upper-lower direction, the upper end of the first standing wall 22 may be positioned higher than the upper end of the second standing wall 23.

The inclination angle of the first standing wall 22 with respect to the first bottom wall 21 is not limited. For example, the first standing wall 22 may be located parallel with the upper-lower direction. The same also applies to the inclination angle of the second standing wall 23 with respect to the first bottom wall 21, the inclination angle of the third standing wall 25 with respect to the second bottom wall 24, and the inclination angle of the fourth standing wall 27 with respect to the second bottom wall 24.

The first bottom wall 21 does not necessarily extend downward as extending from the inside in the vehicle width direction to the outside in the vehicle width direction. For example, the first bottom wall 21 may extend parallel with the vehicle width direction.

The sealant 30 may be attached to the first bottom wall 21, and is not necessarily attached to the top wall 26. In this case, the sealant 30 does not necessarily contact the top wall 26. The sealant 30 may contact the second standing wall 23. The roof 10 does not necessarily include the sealant 30. The sealant 30 does not necessarily extend from the first roof side rail 51 to the second roof side rail 52. For example, the sealant 30 may extend from a position higher than and on the right side of the first roof side rail 51 to a position higher than and on the left side of the second roof side rail 52. With this configuration, the length of the sealant 30 can be reduced, and the amount of use of the sealant 30 can be reduced.

The front roof 11 may extend to a position in front with respect to the third standing wall 25. The rear end portion 13 of the front roof 11 does not necessarily include the curved portion 42. That is, the rear end portion 13 may merely extend in the front-rear direction.

The front roof 11 is not necessarily attached to the rear roof 12 through the first attachment piece 61. For example, the front roof 11 may be attached, with, e.g., a bolt, to a portion of the rear roof 12 positioned in rear with respect to the second standing wall 23.

ASPECTS

The above-described embodiment is a specific example of the following aspects.

(First Aspect) The utility vehicle 100 (off-road vehicle) includes the front roof 11 and the rear roof 12 located in rear of the front roof 11. The rear end portion 13 of the front roof 11 overlaps with the front end portion 14 of the rear roof 12 in the upper-lower direction, and is positioned higher than the front end portion 14.

According to this configuration, there is the clearance between the rear end portion 13 and the front end portion 14 in some cases. While the utility vehicle 100 is traveling forward, traveling air flows from the front to the rear. Since the rear end portion 13 is positioned higher than the front end portion 14 in the vehicle 100, entrance of the traveling air into the vehicle interior through the clearance can be prevented even in a case of the vehicle 100 having the above-described clearance.

(Second Aspect) In the utility vehicle 100 of the first aspect, the front end portion 14 includes the first bottom wall 21 facing the rear end portion 13 in the upper-lower direction and extending in the vehicle width direction and the first standing wall 22 standing from the first bottom wall 21 and extending in the vehicle width direction.

According to this configuration, for example, even when water enters through the clearance between the rear end portion 13 and the front end portion 14 during traveling in the rain, the first standing wall 22 can block entrance of the water into the vehicle interior.

(Third Aspect) In the utility vehicle 100 of the first or second aspect, the first bottom wall 21 extends downward as extending from the inside in the vehicle width direction to the outside in the vehicle width direction.

According to this configuration, water whose entrance into the vehicle interior is blocked by the first standing wall 22 is discharged from the front roof 11 and the rear roof 12 after having flowed from the inside in the vehicle width direction to the outside in the vehicle width direction. With this configuration, the water can be more efficiently discharged as compared to, for example, a case of the first bottom wall 21 extending parallel with the vehicle width direction.

(Fourth Aspect) The utility vehicle 100 of any one of first to third aspects further includes the sealant 30 that seals between the front roof 11 and the rear roof 12. The rear end portion 13 includes the top wall 26 facing the first bottom wall 21 in the upper-lower direction and extending in the vehicle width direction. The sealant 30 contacts, between the top wall 26 and the first bottom wall 21, both the top wall 26 and the first bottom wall 21, and extends in the vehicle width direction.

According to this configuration, water flowing from the rear to the front is blocked by the sealant 30 in advance before reaching the first standing wall 22. This can more reliably prevent entrance of the water into the vehicle interior as compared to a case of the utility vehicle 100 not including the sealant 30. Further, in a case of traveling air flowing from the rear to the front, entrance of the traveling air into the vehicle interior can be prevented even when the traveling air enters through the above-described clearance.

(Fifth Aspect) The utility vehicle 100 of any one of the first to fourth aspects further includes the first roof side rail 51 and the second roof side rail 52 extending in the front-rear direction and aligned in the vehicle width direction. Each of the front roof 11, the rear roof 12, and the sealant 30 extends from the first roof side rail 51 to the second roof side rail 52.

According to this configuration, water blocked by the sealant 30 can be discharged to the outside in the vehicle width direction with respect to the first roof side rail 51 and the second roof side rail 52.

(Sixth Aspect) In the utility vehicle 100 of any one of the first to fifth aspects, the front end portion 14 further includes the second standing wall 23 located in rear with respect to the first standing wall 22 and standing from the first bottom wall 21 and extending in the vehicle width direction.

According to this configuration, the first bottom wall 21, the first standing wall 22, and the second standing wall 23 define the first drainage 18 extending in the vehicle width direction in the front end portion 14. Water is collected to the first drainage 18 so that water discharge can be promoted using the first drainage 18. In a case where water is discharged from the entire surfaces of the front roof 11 and the rear roof 12 in the course of events, the water drops from everywhere at the peripheral edges of the front roof 11 and the rear roof 12. In this example, the water is collected to the first drainage 18 so that the location from which the water drops can be controlled.

(Seventh Aspect) The utility vehicle 100 of any one of first to sixth aspects further includes the sealant 30 that seals between the front roof 11 and the rear roof 12. The rear end portion 13 includes the top wall 26 facing the first bottom wall 21 in the upper-lower direction and extending in the vehicle width direction. The sealant 30 contacts, between the top wall 26 and the first bottom wall 21, both the top wall 26 and the first bottom wall 21, and extends in the vehicle width direction.

According to this configuration, water can be blocked by the sealant 30 in advance before reaching the first standing wall 22 even in a case of the water having entered the space in front with respect to the second standing wall 23. Further, in a case of travelling air flowing from the rear to the front, entrance of the traveling air into the vehicle interior can be prevented even when the traveling air enters through the above-described clearance.

(Eighth Aspect) In the utility vehicle 100 of any one of the first to seventh aspects, the sealant 30 is separated from the second standing wall 23.

According to this configuration, the first drainage 18 is not fully closed with the sealant 30. That is, even in a case of the roof 10 including the sealant 30, the first drainage 18 can be ensured in the clearance between the sealant 30 and the second standing wall 23.

(Ninth Aspect) In the utility vehicle 100 of any one of the first to eighth aspects, the front end portion 14 further includes the second bottom wall 24 located in rear with respect to the second standing wall 23 and extending in the vehicle width direction and the third standing wall 25 standing from the second bottom wall 24 and extending in the vehicle width direction.

According to this configuration, water flowing from the rear to the front is blocked by the third standing wall 25 in advance before reaching the second standing wall 23. This can more reliably prevent entrance of the water into the vehicle interior as compared to a case of the front end portion 14 not including the third standing wall 25.

(Tenth Aspect) In the utility vehicle 100 of any one of the first to ninth aspects, the front roof 11 extends to the rear beyond the third standing wall 25.

According to this configuration, the distance between the upper end of the third standing wall 25 and the front roof 11 can be shorter as compared to a case of the front roof 11 extending to the position in front with respect to the third standing wall 25. That is, the water entrance area can be decreased. Thus, the amount of water which can enter through the clearance between the rear end portion 13 and the front end portion 14 can be reduced. Further, in a case of traveling air flowing from the rear to the front, the amount of traveling air which can enter through the above-described clearance can be reduced.

(Eleventh Aspect) In the utility vehicle 100 of any one of the first to tenth aspects, the portion of the rear end portion 13 positioned in rear with respect to the third standing wall 25 extends downward as extending rearward, and extends to the position lower than the upper end of the third standing wall 25.

According to this configuration, the clearance between the rear end portion 13 and the front end portion 14 is in the labyrinth shape. That is, the flow path for water and traveling air can be meandered between the rear end portion 13 and the front end portion 14. As a result, water and traveling air are less likely to enter the clearance between the rear end portion 13 and the front end portion 14.

(Twelfth Aspect) In the utility vehicle 100 of any one of the first to eleventh aspects, the front end portion 14 further includes the first attachment piece 61 extending forward from the first standing wall 22, and the front roof 11 is attached to the rear roof 12 through the first attachment piece 61.

According to this configuration, even when water flowing from the rear to the front reaches the first standing wall 22, such water is blocked by the first standing wall 22, and therefore, a state of the first attachment piece 61 getting the water thereon is prevented. As a result, corrosion of, e.g., the bolt screwed into the first attachment piece 61 can be prevented.

What is claimed:

1. An off-road vehicle comprising:
a front roof; and
a rear roof located in rear of the front roof,
wherein a rear end portion of the front roof overlaps with a front end portion of the rear roof in an upper-lower direction,
the rear end portion is positioned higher than the front end portion,
the front end portion includes a first bottom wall facing the rear end portion in the upper-lower direction and extending in a vehicle width direction and a first standing wall standing from the first bottom wall and extending in the vehicle width direction,
the front end portion of a portion of the rear roof that extends substantially horizontally further includes an attachment piece extending forward from the first standing wall, and
the front roof is attached to the rear roof through the attachment piece.

2. The off-road vehicle of claim 1, wherein
the first bottom wall extends downward as extending from an inside in the vehicle width direction to an outside in the vehicle width direction.

3. The off-road vehicle of claim 1, further comprising:
a sealant that seals between the front roof and the rear roof,
wherein the rear end portion includes a top wall facing the first bottom wall in the upper-lower direction and extending in the vehicle width direction, and
the sealant contacts, between the top wall and the first bottom wall, both the top wall and the first bottom wall, and extends in the vehicle width direction.

4. The off-road vehicle of claim 3, further comprising:
a first roof side rail and a second roof side rail extending in a front-rear direction and aligned in the vehicle width direction,
wherein each of the front roof, the rear roof, and the sealant extends from the first roof side rail to the second roof side rail.

5. The off-road vehicle of claim 1, wherein
the front end portion further includes a second standing wall located in rear with respect to the first standing wall and standing from the first bottom wall and extending in the vehicle width direction.

6. The off-road vehicle of claim 5, further comprising:
a sealant that seals between the front roof and the rear roof,
wherein the rear end portion includes a top wall facing the first bottom wall in the upper-lower direction and extending in the vehicle width direction, and
the sealant contacts, between the top wall and the first bottom wall, both the top wall and the first bottom wall, and extends in the vehicle width direction.

7. The off-road vehicle of claim 6, wherein
the sealant is separated from the second standing wall.

8. The off-road vehicle of claim 5, wherein
the front end portion further includes a second bottom wall located in rear with respect to the second standing wall and extending in the vehicle width direction and a third standing wall standing from the second bottom wall and extending in the vehicle width direction.

9. The off-road vehicle of claim 8, wherein
the front roof extends to a rear beyond the third standing wall.

10. The off-road vehicle of claim 9, wherein
a portion of the rear end portion positioned in rear with respect to the third standing wall extends downward as extending rearward, and extends to a position lower than an upper end of the third standing wall.

* * * * *